United States Patent
Takigawa (10) Patent No.: US 11,270,859 B2
(45) Date of Patent: Mar. 8, 2022

(54) SUBMARINE CABLE SYSTEM, BRANCHING DEVICE, AND STATE RESPONSE METHOD THEREFOR

(71) Applicant: NEC Corporation, Tokyo (JP)

(72) Inventor: Yoshinari Takigawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/969,017

(22) PCT Filed: Feb. 18, 2019

(86) PCT No.: PCT/JP2019/005876
§ 371 (c)(1),
(2) Date: Aug. 11, 2020

(87) PCT Pub. No.: WO2019/163716
PCT Pub. Date: Aug. 29, 2019

(65) Prior Publication Data
US 2021/0027960 A1 Jan. 28, 2021

(30) Foreign Application Priority Data
Feb. 20, 2018 (JP) .............................. JP2018-027514

(51) Int. Cl.
*H04B 10/80* (2013.01)
*H01H 47/22* (2006.01)
(Continued)

(52) U.S. Cl.
CPC .......... *H01H 47/22* (2013.01); *H01H 47/002* (2013.01); *H02G 9/02* (2013.01); *H04B 3/44* (2013.01)

(58) Field of Classification Search
CPC .... H01H 47/22; H01H 47/002; H01H 47/001; H04B 3/44; H02G 9/02
See application file for complete search history.

(56) References Cited

U.S. PATENT DOCUMENTS

2013/0190968 A1* 7/2013 Nitzberg ................. G07C 3/00
701/31.6
2014/0103739 A1 4/2014 Takigawa
(Continued)

FOREIGN PATENT DOCUMENTS

CN 102969200 A 3/2013
CN 104527446 A 4/2015
(Continued)

OTHER PUBLICATIONS

Chinese Office Action for CN Application No. 201980014223.4 dated Mar. 29, 2021 with English Translation.
(Continued)

*Primary Examiner* — Jared Fureman
*Assistant Examiner* — Esayas G Yeshaw
(74) *Attorney, Agent, or Firm* — Sughrue Mion, PLLC (57) ABSTRACT

Provided are: a submarine cable system with which it is possible, with a simple configuration, to acquire the state of each of a plurality of high-voltage relays in a branching device; the branching device; and a state response method therefor. The branching device comprises: a plurality of interlocking relays respectively corresponding to a plurality of high-voltage relays for switching feeding paths; a drive unit which supplies drive electric currents supplied to the plurality of high-voltage relays to the plurality of corresponding interlocking relays, respectively; a state detection unit which detects operation states of the plurality of interlocking relays as the operation states of the plurality of high-voltage relays; and a response unit which, on the basis of the result of detection of the operation states of the plurality of interlocking relays, transmits the operation states of the plurality of high-voltage relays.

15 Claims, 7 Drawing Sheets

(51) Int. Cl.
*H01H 47/00* (2006.01)
*H02G 9/02* (2006.01)
*H04B 3/44* (2006.01)

(56) References Cited

U.S. PATENT DOCUMENTS

| | | | | |
|---|---|---|---|---|
| 2014/0265583 A1* | 9/2014 | Chaudhuri | ............. | H02J 3/386 |
| | | | | 307/52 |
| 2014/0308036 A1 | 10/2014 | Aida | | |
| 2016/0203930 A1* | 7/2016 | Aida | ........................ | H04B 3/44 |
| | | | | 307/113 |
| 2019/0094937 A1* | 3/2019 | Sultenfuss | ............ | G06F 1/1635 |

FOREIGN PATENT DOCUMENTS

| | | | |
|---|---|---|---|
| CN | 105320003 | A | 2/2016 |
| CN | 105474552 | A | 4/2016 |
| CN | 106328445 | A | 1/2017 |
| JP | 4124438 | B2 | 7/2008 |
| WO | 2013/002391 | A1 | 1/2013 |
| WO | 2013/094266 | A1 | 6/2013 |
| WO | 2015/025518 | A1 | 2/2015 |
| WO | 2017/141855 | A1 | 8/2017 |

OTHER PUBLICATIONS

International Search Report for PCT/JP2019/005876 dated Apr. 9, 2019 (PCT/ISA/210).
Written Opinion for PCT/JP2019/005876 dated Apr. 9, 2019 (PCT/ISA/237).

* cited by examiner

12# SUBMARINE CABLE SYSTEM, BRANCHING DEVICE, AND STATE RESPONSE METHOD THEREFOR

CROSS REFERENCE TO RELATED APPLICATIONS

This application is a National Stage of International Application No. PCT/JP2019/005876 filed Feb. 18, 2019, claiming priority based on Japanese Patent Application No. 2018-027514 filed Feb. 20, 2018, the disclosure of which is incorporated herein in its entirety by reference.

TECHNICAL FIELD

The present invention relates to a submarine cable system, a branching device, and a state response method therefor and specifically relates to a submarine cable system of a remote control type, a branching device, and a state response method therefor.

BACKGROUND ART

A repeater and a branching device being used in a submarine cable system are supplied with power from a feeding device provided in a station building on a land. When, for example, a feeding line included in a submarine cable is connected to a power source of each of a repeater and a branching device, a power source is supplied to the repeater and the branching device from a feeding device of each of a plurality of land stations. The branching device includes a plurality of high-voltage relays capable of switching whether to connect each of a plurality of feeding lines connected to a plurality of land stations to a power source of the branching device or to a sea earth (SE). A management device provided in a land station transmits a control command for controlling a plurality of high-voltage relays to a branching device and thereby controls a power source of a repeater belonging to an associated branch and a feeding path to the branching device. When, for example, a failure occurs in a repeater, the management device transmits a control command to the branching device, switches a high-voltage relay connected to a feeding line of a branch of the repeater in which the failure occurs, to an SE side, and interrupts a power source of the repeater of the branch in which the failure occurs. The management device transmits a control command to the branching device, switches a high-voltage relay connected to a feeding line from another land station to a power source side, and switches the feeding path in such a way that a power source is supplied to the branching device from the another land station. When a repeater of a branch in which a failure occurs is connected to an SE and a power source is interrupted in such a manner, repair is easily performed, and when a feeding path is switched to another station building, stable power supply to the branching device can be achieved.

As a related technique, PTL 1, for example, proposes a technique for acquiring information of a current power source supply state from a branching device. The branching device according to PTL 1 short-circuits/opens both ends of resistance values connected in series by using a relay contact point operating in synchronization with a high-voltage relay, monitors a total of the resistance values connected in series, and thereby acquires a state of the branching device.

CITATION LIST

Patent Literature

[PTL 1] International Publication No. WO 2015/025518

SUMMARY OF INVENTION

Technical Problem

However, the branching device according to PTL 1 is configured to monitor a total of a plurality of resistance values connected in series, and therefore it is difficult to acquire a state of each of a plurality of high-voltage relays when the plurality of resistance values are not devised.

A main object of the present invention is to provide, based on a simple configuration, a submarine cable system capable of acquiring a state of each of a plurality of high-voltage relays inside a branching device, a branching device, and a state response method therefor.

Solution to Problem

A branching device according to one aspect of the present invention includes: a plurality of interlocking relays individually associated with a plurality of high-voltage relays that switch a feeding path; a drive unit that supplies drive electric current supplied to the plurality of high-voltage relays to the plurality of associated interlocking relays; a state detection unit that detects an operation state of each of the plurality of interlocking relays as an operation state of each of the plurality of high-voltage relays; and a response unit that transmits, as an operation state of each of the plurality of high-voltage relays, a response signal indicating an operation state of each of the plurality of interlocking relays.

A submarine cable system according to another aspect of the present invention includes: the above-described branching device; and a management device that transmits a control signal for the feeding path to the branching device and receives the response signal from the branching device.

A state response method according to still another aspect of the present invention includes: in a state response method of a branching device including a plurality of high-voltage relays that switch a feeding path, supplying drive electric current supplied to the plurality of high-voltage relays to each of associated interlocking relays; detecting an operation state of each of the plurality of interlocking relays as an operation state of each of the plurality of high-voltage relays; and transmitting, as an operation state of each of the plurality of high-voltage relays, a response signal indicating an operation state of each of the plurality of interlocking relays.

Advantageous Effects of Invention

According to the above-described aspects of the present invention, a state of each of a plurality of high-voltage relays inside a branching device can be acquired based on a simple configuration.

EXAMPLE EMBODIMENT

Figure 1:
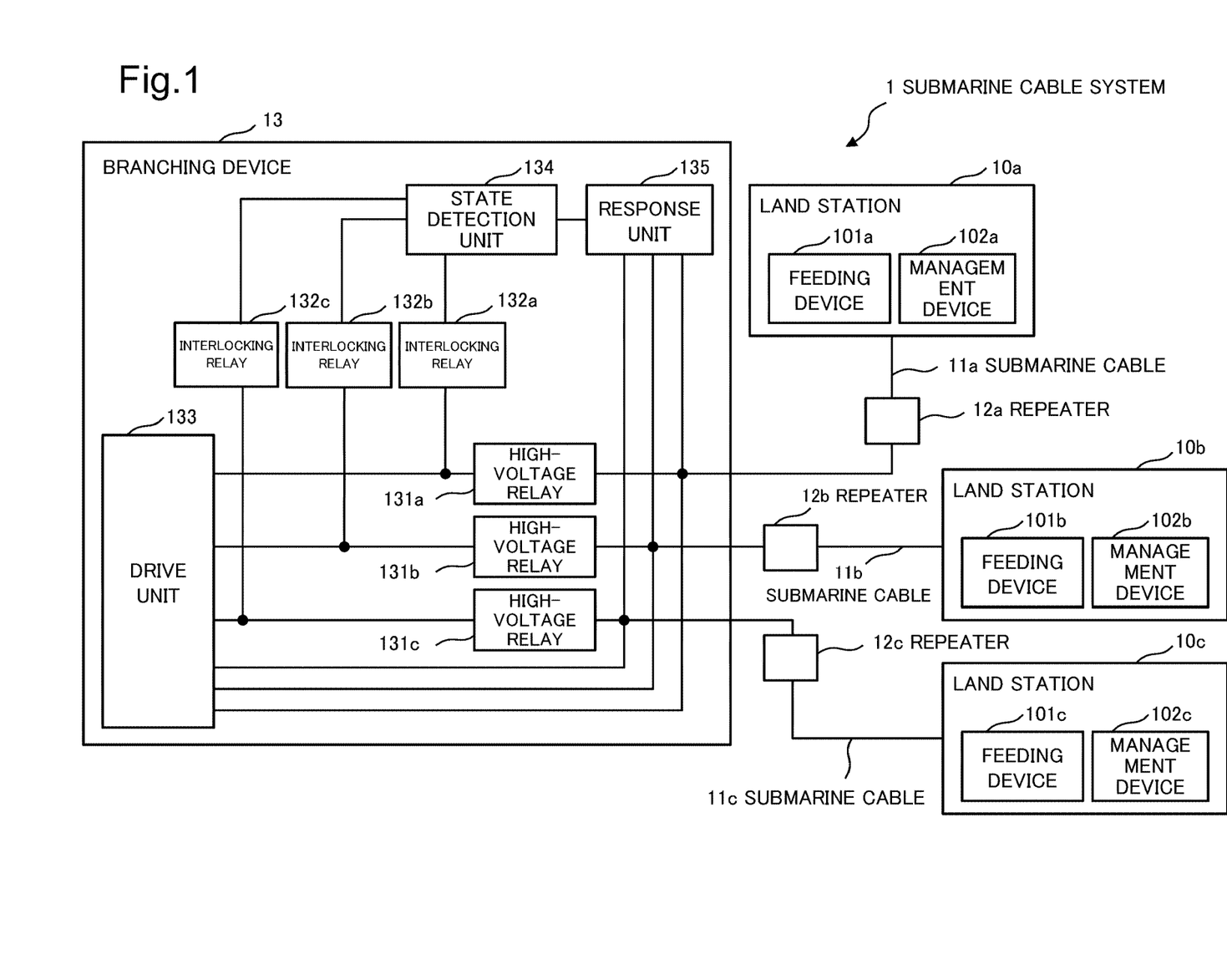
FIG. 1 is a block diagram illustrating one example of a configuration of a first example embodiment.

Next, a first example embodiment exemplarily illustrated is described with reference to the accompanying drawings. FIG. 1 is a block diagram illustrating one example of a configuration of the first example embodiment. As illustrated in FIG. 1, a submarine cable system 1 includes a plurality of land stations 10a, 10b, and 10c, submarine cables 11a, 11b, and 11c that transmit a communication signal, repeaters 12a, 12b, and 12c that relay a communication signal, and a branching device 13 that branches a communication signal.

The land stations 10a, 10b, and 10c include feeding devices 101a, 101b, and 101c, respectively. The submarine cables 11a, 11b, and 11c transmit communication signals and power supplied from the feeding devices 101a, 101b, and 101c of land stations to the repeaters 12a, 12b, and 12c and the branching device 13, respectively.

The branching device 13 includes, as illustrated in FIG. 1, a plurality of high-voltage relays 131a, 131b, and 131c that switch a feeding path of the branching device 13. The branching device 13 includes a plurality of interlocking relays 132a, 132b, and 132c individually associated with the plurality of high-voltage relays 131a, 131b, and 131c. The high-voltage relays 131a, 131b, and 131c connect power sources supplied from the feeding devices 101a, 101b, and 101c, respectively, to a power source of the branching device 13 or an SE. The high-voltage relays 131a, 131b, and 131c may be retention-type (latch) relays or non-retention-type (non-latch) relays. The high-voltage relays 131a, 131b, and 131c are applied with high voltage, and therefore it is difficult to monitor a contact point connection state of a high-voltage relay itself.

The land stations 10a, 10b, and 10c include management devices 102a, 102b, and 102c, respectively, and the submarine cables 11a, 11b, and 11c transmit communication signals and control signals for feeding paths of the branching device 13 from the management devices 102a, 102b, and 102c, respectively. A control signal for a feeding path of the branching device 13 is, for example, a signal that issues an instruction for switching a movable contact point of each of a plurality of high-voltage relays 131a, 131b, and 131c and for detecting an operation state of each of the high-voltage relays 131a, 131b, and 131c. A response signal is, for example, a response signal that responds with an operation state in response to an instruction for detecting an operation state of each of the high-voltage relays 131a, 131b, and 131c.

The interlocking relays 132a, 132b, and 132c are monitoring relays that operate by being interlocked with associated high-voltage relays 131a, 131b, and 131c, respectively.

The interlocking relays 132a, 132b, and 132c are not necessarily a relay capable of switching a high voltage, but when an associated high-voltage relay is formed as a latch type, an interlocking relay is also a latch-type relay and when an associated high-voltage relay is formed as an unlatch type, an interlocking relay is also an unlatch-type relay. The interlocking relays 132a, 132b, and 132c do not necessarily have the same performance as the high-voltage relay 131a, 131b, and 131c, and a small low-voltage relay is satisfactory.

The branching device 13 includes, as illustrated in FIG. 1, a drive unit 133 that supplies drive electric current supplied to a plurality of high-voltage relays 131a, 131b, and 131c to a plurality of associated interlocking relays 132a, 132b, and 132c, respectively. The branching device 13 includes a state detection unit 134 that detects an operation state of each of a plurality of interlocking relays 132a, 132b, and 132c as an operation state of each of a plurality of high-voltage relays 131a, 131b, and 131c. The branching device 13 includes a response unit 135 that transmits, based on a result of detecting an operation state of each of a plurality of interlocking relays 132a, 132b, and 132c, a response signal indicating an operation state of each of a plurality of high-voltage relays 131a, 131b, and 131c to each of the management devices 102a, 102b, and 102c.

Figure 2:
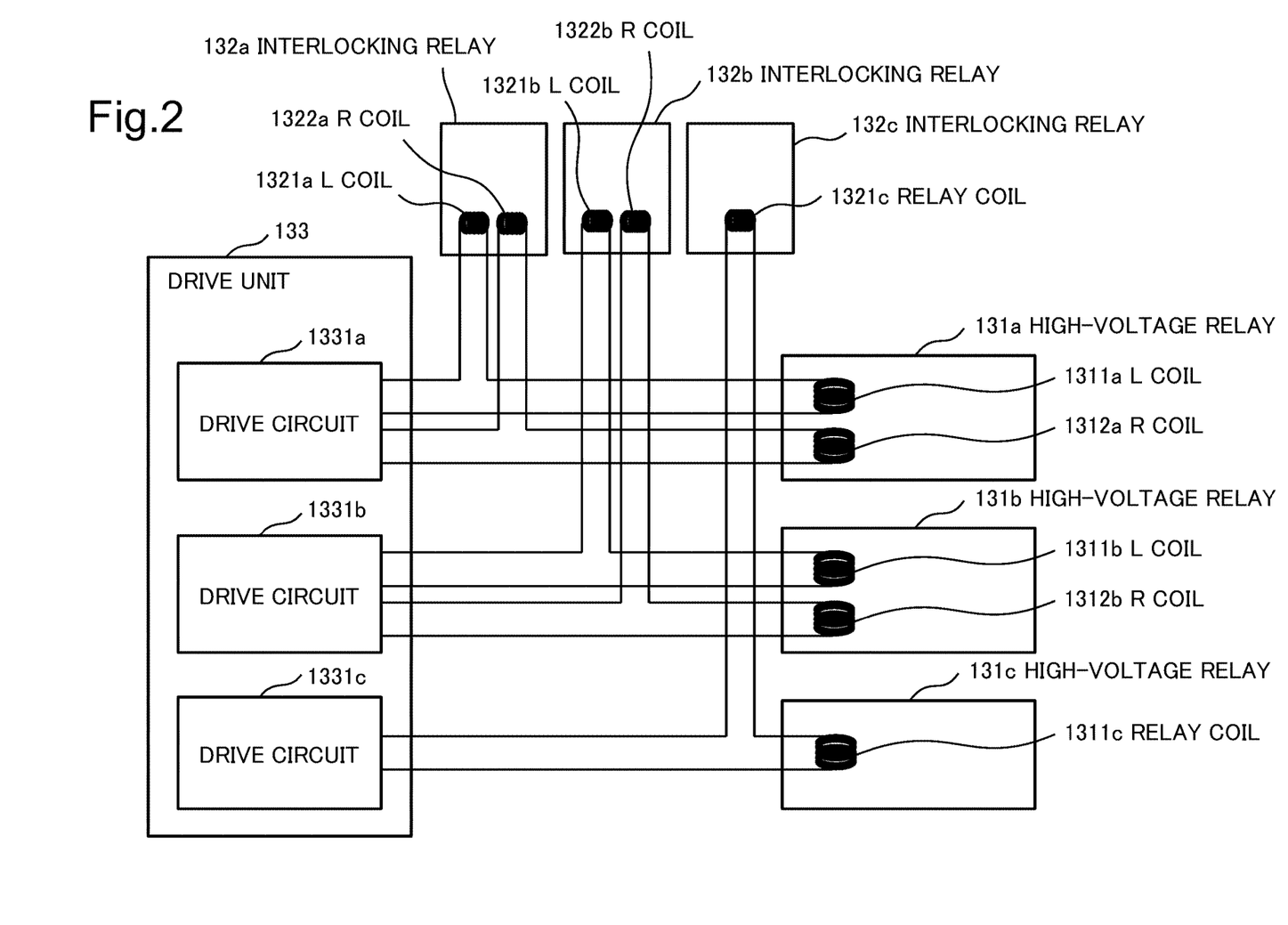
FIG. 2 is a diagram illustrating one example of a connection configuration among a drive unit, a high-voltage relay, and an interlocking relay in FIG. 1.

FIG. 2 is a diagram illustrating one example of a connection configuration among a drive unit, a high-voltage relay, and an interlocking relay in FIG. 1. FIG. 2 illustrates an example in which a high-voltage relay 131a and a high-voltage relay 131b each are a latch-type relay and a high-voltage relay 131c is an unlatch-type relay.

As illustrated in FIG. 2, the drive unit 133 includes a drive circuit 1331a that supplies drive electric current to the high-voltage relay 131a and an interlocking relay 132a. The drive unit 133 includes a drive circuit 1331b that supplies drive electric current to the high-voltage relay 131b and an interlocking relay 132b and a drive circuit 1331c that supplies drive electric current to the high-voltage relay 131c and an interlocking relay 132c.

As illustrated in FIG. 2, L coils, R coils, and relay coils of the interlocking relays 132a, 132b, and 132c associated with the high-voltage relays 131a, 131b, and 131c are connected in series. For example, latch-side L coils 1311a and 1311b of latch-type high-voltage relays 131a and 131b and latch-side L coils 1321a and 1321b of associated interlocking relays 132a and 132b are connected in series and are connected to drive output terminals of L coils of the derive circuits 1331a and 1331b. Reset-side R coils 1312a and 1312b of the high-voltage relays 131a and 131b and reset-side R coils 1322a and 1322b of associated interlocking relays 132a and 132b are connected in series and are connected to drive output terminals of R coils of the derive circuits 1331a and 1331b.

A relay coil 1311c of a non-latch-type high-voltage relay 131c and a relay coil 1321c of an associated interlocking relay 132c are connected in series and are connected to a drive output terminal of a relay coil of the drive circuit 1331c.

Figure 3:
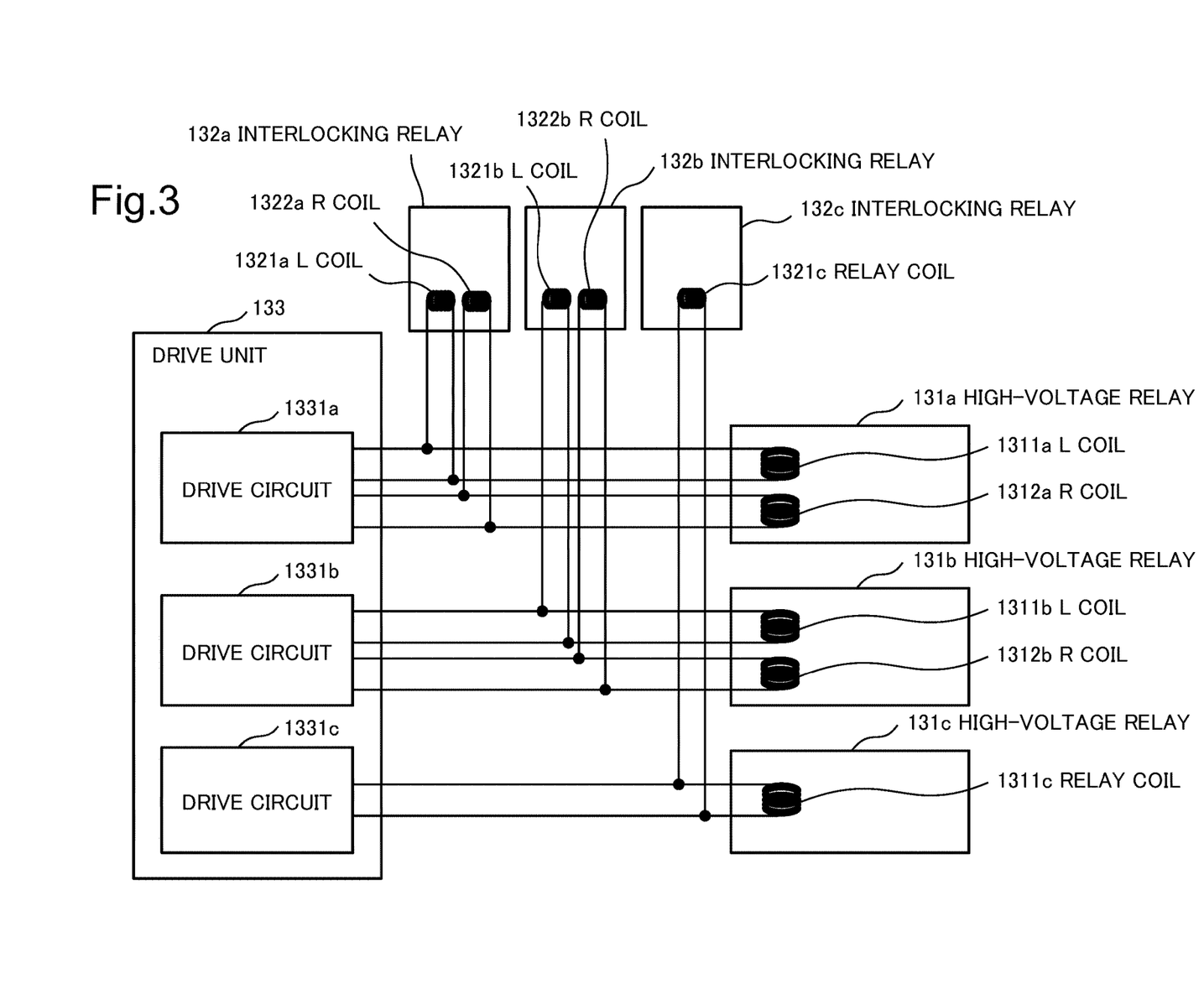
FIG. 3 is a diagram illustrating another example of a connection configuration among a drive unit, a high-voltage relay, and an interlocking relay in FIG. 1.

According to such a configuration, when a high-voltage relay operates, an associated interlocking relay also certainly operates, and thereby a high-voltage relay and an associated interlocking relay are always in the same contact point state. As in FIG. 2, without limitation to a configuration in which L coils, R coils, and relay coils of a high-voltage relay and an associated interlocking relay are connected in series, a configuration in which a high-voltage relay and an associated interlocking relay are connected to a drive circuit in such a way as to be certainly in the same contact point state is employable. As illustrated in FIG. 3, for example, L coils, R coils, and relay coils of high-voltage relays 131a, 131b, and 131c and associated interlocking relays 132a, 132b, 132c may be connected in parallel.

Figure 4:
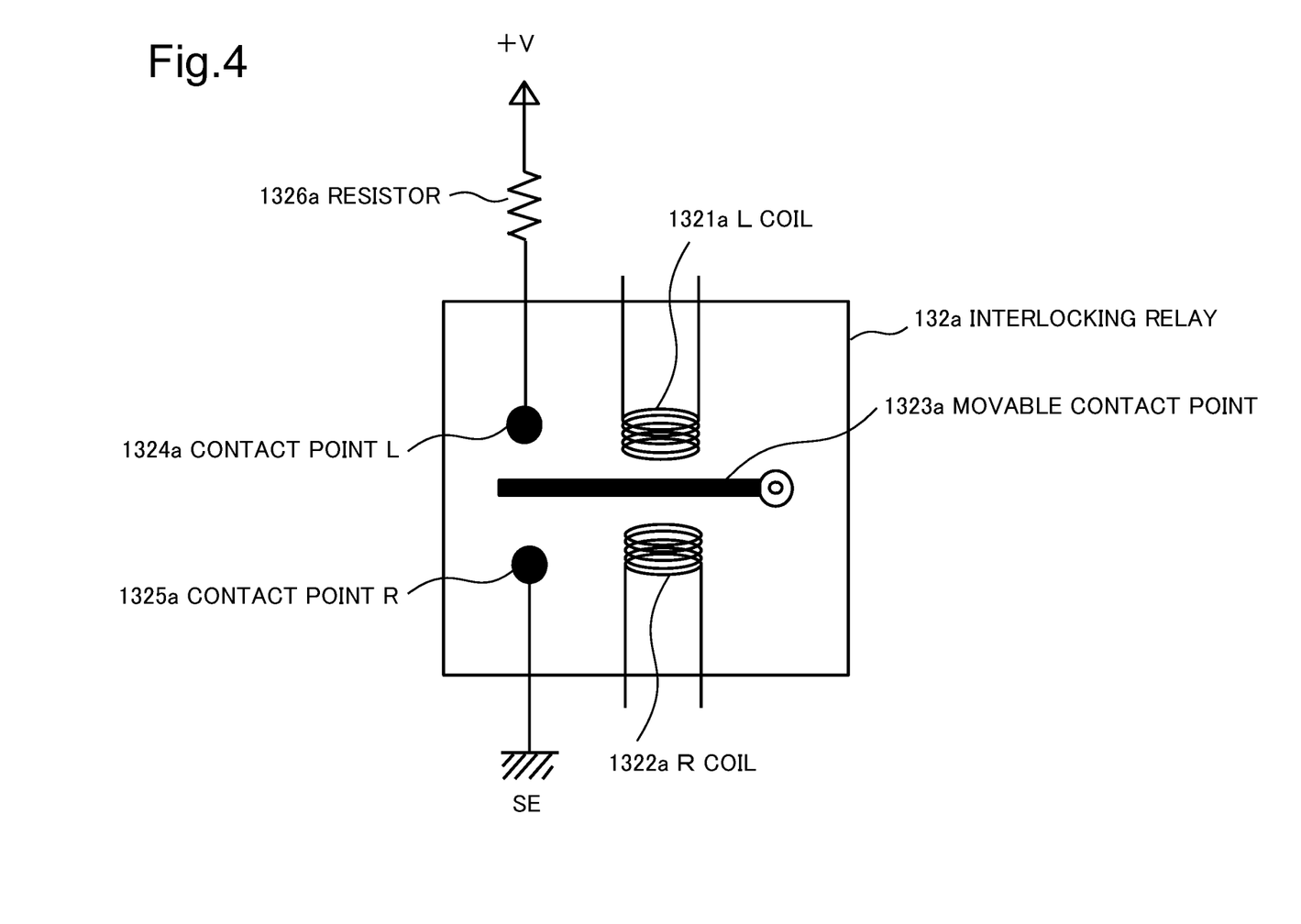
FIG. 4 is a diagram illustrating one example of a configuration of an interlocking relay in FIG. 1.

Next, a configuration of the interlocking relays 132a, 132b, and 132c is described. FIG. 4 is a diagram illustrating one example of a configuration of an interlocking relay in FIG. 1. In FIG. 4, an example of a latch-type interlocking relay 132a is illustrated, but when the interlocking relay 132b is formed as a latch type, the interlocking relay 132b has a similar configuration.

As illustrated in FIG. 4, a latch-type interlocking relay 132a includes a latch-side L coil 1321a, a reset-side R coil 1322a, a movable contact point 1323a, a latch-side contact point L 1324a, and a reset-side contact point R 1325a. As illustrated in FIG. 4, the latch-side L coil 1321a and the reset-side R coil 1322a are disposed in an opposed manner across the movable contact point 1323a. The latch-side contact point L 1324a and the reset-side contact point R 1325a are disposed in an opposed manner across the movable contact point 1323a. The latch-side contact point L 1324a is disposed in a position to which the movable contact point 1323a moves and contacts when drive electric current flows in the L coil 1321a. The reset-side contact point R 1325a is disposed in a position to which the movable contact point 1323a moves and contacts when drive electric current flows in the R coil 1322a.

The contact point L 1324a of the interlocking relay 132a is connected, for example, to a power source voltage of the state detection unit 134 via a resistor 1326a, and the contact point R 1325a is connected to an SE.

The drive circuit 1331a causes, when receiving a control signal for controlling a movable contact point of the high-voltage relay 131a to a latch side, drive electric current to flow from an output terminal for L coil drive. Based on the drive electric current, the high-voltage relay 131a and the movable contact point 1323a of the interlocking relay 132a move to an L-coil 1321a side and make contact with the contact point L 1324a. The drive circuit 1331a causes, when receiving a control signal for controlling the movable contact point of the high-voltage relay 131a to a reset side, drive electric current to flow from an output terminal for R coil drive. Based on the drive electric current, the high-voltage relay 131a and the movable contact point 1323a of the interlocking relay 132a move to an R-coil 1322a side and make contact with the contact point R 1325a.

The drive circuit 1331a of the drive unit 133 switches, based on a control signal for a feeding path from the management devices 102a, 102b, and 102c, a latch-type high-voltage relay 131a and the movable contact point 1323a of the interlocking relay 132a to a latch side or a reset side according to feeding or non-feeding from the feeding device 101a. Similarly, the drive circuit 1331b switches, based on a control signal for a feeding path from the management devices 102a, 102b, and 102c, a latch-type high-voltage relay 131b and a movable contact point of the interlocking relay 132b to a latch side or a reset side according to feeding or non-feeding from the feeding device 101b.

Figure 5:
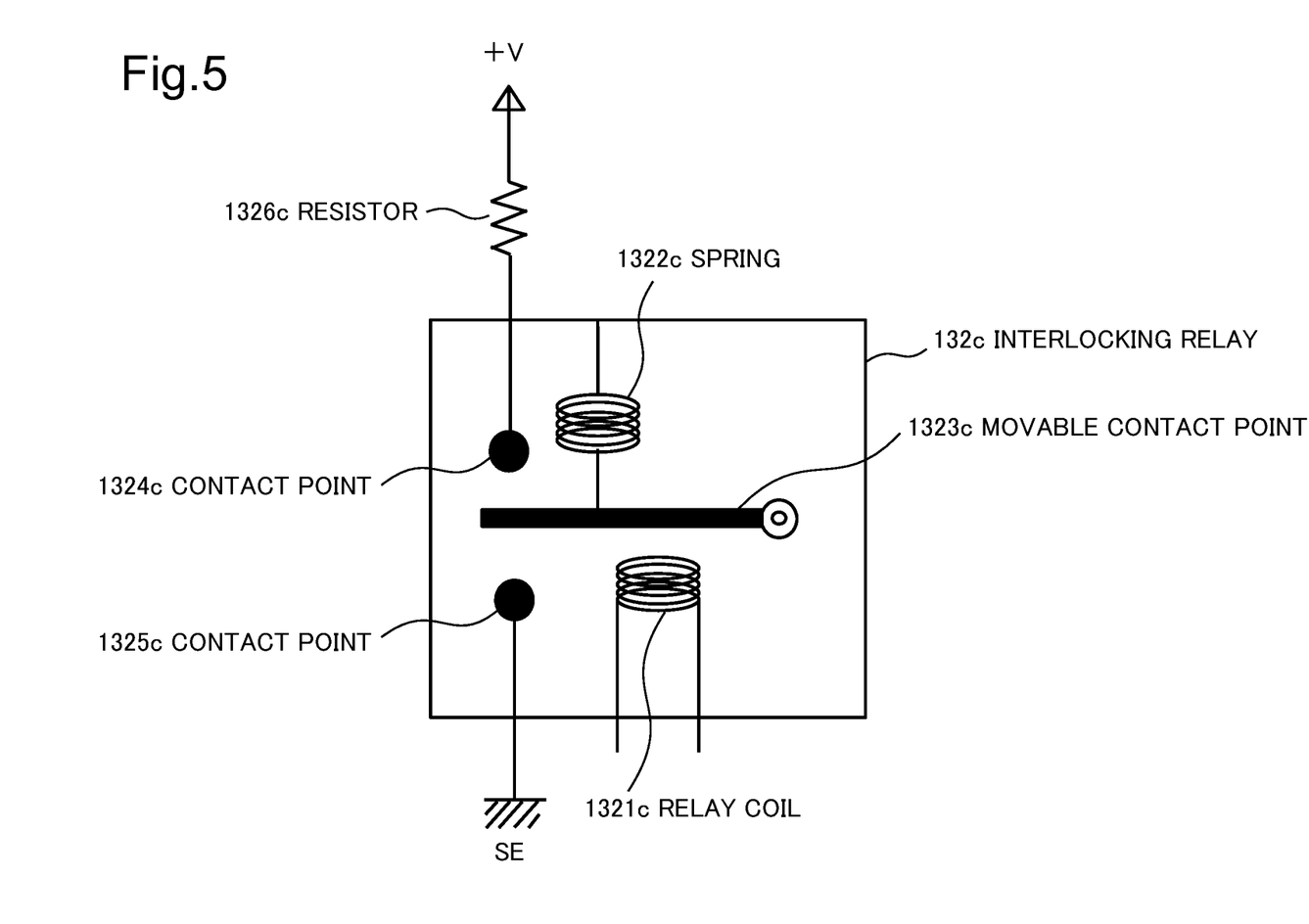
FIG. 5 is a diagram illustrating another example of a configuration of an interlocking relay in FIG. 1.

FIG. 5 is a diagram illustrating another example of a configuration of an interlocking relay in FIG. 1. An interlocking relay 132c is, for example, a non-latch-type relay, and FIG. 5 illustrates a configuration of a non-latch-type interlocking relay 132c. The non-latch-type interlocking relay 132c includes, as illustrated in FIG. 5, a relay coil 1321c, a spring 1322c, a movable contact point 1323c, an ON-side contact point 1324c, and an OFF-side contact point 1325c. The ON-side contact point 1324c and the OFF-side contact point 1325c are disposed in an opposed manner across the movable contact point 1323c. The spring 1322c applies an elastic force to the movable contact point 1323c in such a way that when drive electric current does not flow in the relay coil 1321c, the movable contact point 1323c separates from the ON-side contact point 1324c and makes contact with the OFF-side contact point 1325c. The movable contact point 1323c is attached with a magnet (not illustrated) that repels the relay coil 1321c when drive electric current flows in the relay coil 1321c, and the ON-side contact point 1324c is disposed in a position to which the movable contact point 1323c moves and contacts when drive electric current flows in the relay coil 1321c.

The ON-side contact point 1324c of the interlocking relay 132c is connected, for example, to a power source voltage of the state detection unit 134 via a resistor 1326c, and the OFF-side contact point 1325c is connected to an SE.

The drive circuit 1331c causes, when receiving a control signal for controlling a movable contact point of the high-voltage relay 131c to an ON side from the management devices 102a, 102b, and 102c, drive electric current to flow from an output terminal for relay coil drive. Based on the electric current, the high-voltage relay 131c and the movable contact point 1323c of the interlocking relay 132c moves to a relay-coil 1321c side and makes contact with the ON-side contact point 1324c. The drive circuit 1331c interrupts, when receiving a control signal for controlling a movable contact point of the high-voltage relay 131c to an OFF side, drive electric current from an output terminal for relay coil drive. Thereby, for example, based on an elastic force of the spring 1322c included in the interlocking relay 132c, the movable contact point 1323c makes contact with the OFF-side contact point 1325c. In this manner, the drive circuit 1331c of the drive unit 133 switches, based on a control signal for a feeding path from the management devices 102a, 102b, and 102c, the non-latch-type high-voltage relay 131c and a movable contact point of the interlocking relay 132c to an ON side or an OFF side according to feeding or non-feeding from the feeding device 101c.

Figure 6:
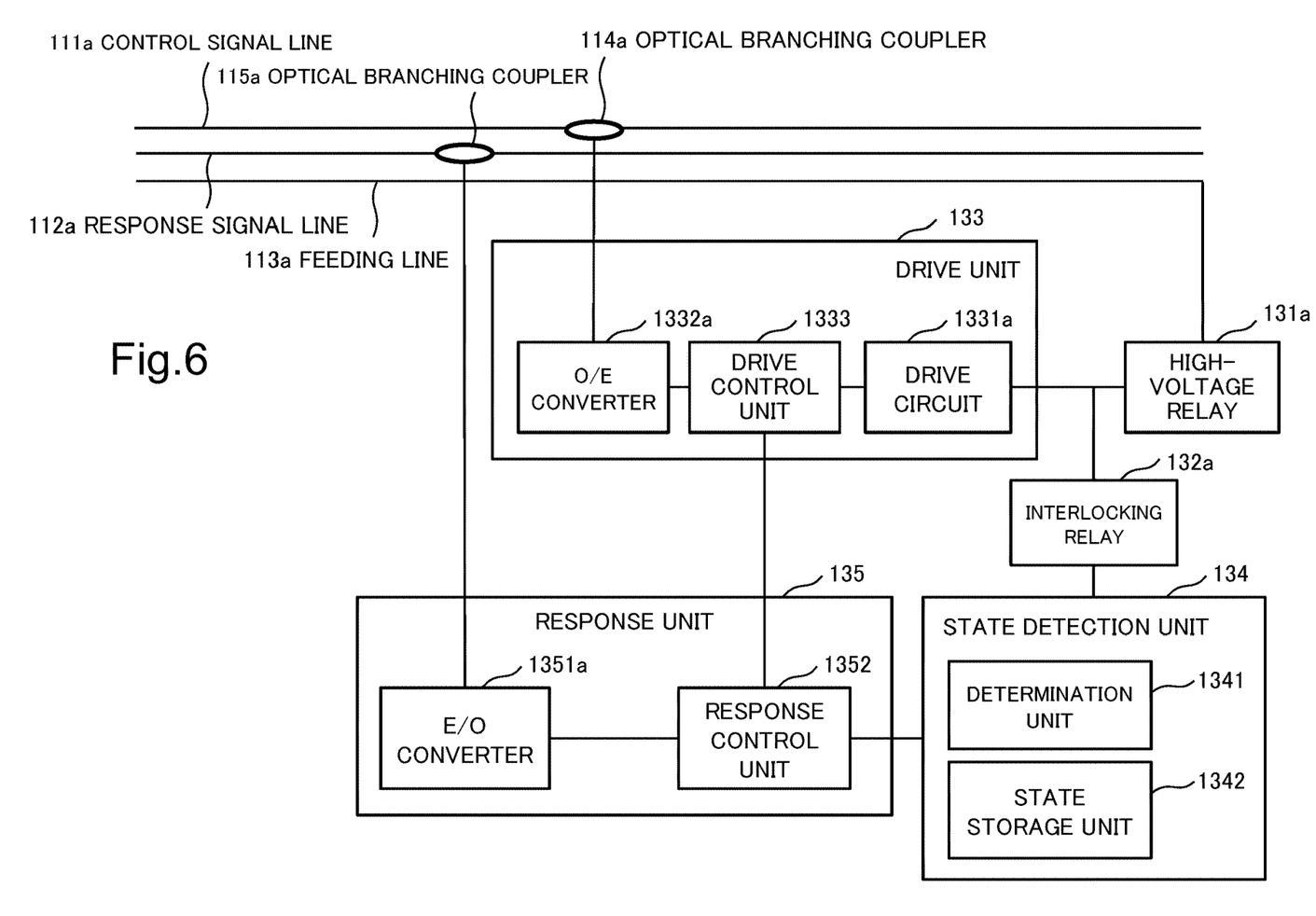
FIG. 6 is a block diagram illustrating one example of a configuration of a submarine cable, a drive unit, and a response unit in FIG. 1.

FIG. 6 is a block diagram illustrating one example of a configuration of a submarine cable, a drive unit, and a response unit in FIG. 1. FIG. 6 illustrates, for simplification, only a configuration of a portion relating to a control signal line 111a, a response signal line 111b, a feeding line 113a, and a high-voltage relay 131a relating to a submarine cable 11a according to the present example embodiment, but a similar configuration relating to each of submarine cables 11b and 11c is also included. A drive unit is connected to not only the high-voltage relay 131a and the interlocking relay 132a but also the high-voltage relays 131b and 131c and the interlocking relays 132b and 132c. The state detection unit 134 is connected to not only the interlocking relay 132a but also the interlocking relays 132b and 132c.

As illustrated in FIG. 6, the feeding line 113a that transmits, inside the branching device 13, power transmitted by the submarine cable 11a from a feeding device 101a is connected to the high-voltage relay 131a.

As illustrated in FIG. 6, the control signal line 111a that transmits, inside the branching device 13, a control signal transmitted by the submarine cable 11a includes an optical branching coupler 114a. The optical branching coupler 114a branches, to the drive unit 133, a control signal from a management device 102a of a land station 10a. A control signal line that transmits, inside the branching device 13, a control signal transmitted by each of submarine cables 11b and 11c similarly includes an optical branching coupler. The optical branching coupler branches, similarly to the optical branching coupler 114a, a control signal from each of the management devices 102b and 102c to the drive unit 133 inside the branching device 13.

The drive unit 133 includes an O/E converter 1332a that converts an optical signal output from the optical branching coupler 114a to an electric signal. The O/E converter 1332a includes, for example, a photo diode (PD), converts an optical signal being a control signal from the management device 102a to an electric signal, and outputs the converted electric signal to a drive control unit 1333 inside the drive unit 133. A drive unit also includes an O/E converter that converts, from an optical signal to an electric signal, control signals from the management devices 102b and 102c branched by an optical branching coupler. The branched control signals from the management devices 102b and 102c each are converted by an O/E converter of the drive unit 133 from an optical signal to an electric signal and are output to the drive control unit 1333 inside the drive unit 133.

The drive control unit 1333 determines, when receiving a control signal for a high-voltage relay from an optical branching coupler, whether the control signal is a control signal for issuing an instruction for switching a contact point of the high-voltage relay.

In a case of a control signal for issuing an instruction for switching a contact point of a high-voltage relay, the drive control unit 1333 instructs, when supplying drive electric current to a high-voltage relay and an associated an interlocking relay, the response unit 135 to transmit a response signal indicating an operation state of the high-voltage relay. In other words, the drive control unit 1333 outputs a control signal for switching a contact point of the high-voltage relay 131a to the drive circuit 1331a associated with the high-voltage relay 131a being a target of switching. The drive control unit 1333 outputs, to a response control unit 1352 of the response unit 135, a control signal for issuing an instruction for a response of an operation state of the high-voltage relay 131a to the management device 102a that transmits a control signal for switching a contact point of the high-voltage relay 131a.

In a case of a control signal for issuing an instruction for a response of an operation state instead of a control signal for issuing an instruction for switching a contact point, the drive control unit 1333 does not output a control signal to a drive circuit. The drive control unit 1333 outputs, to the response control unit 1352 of the response unit 135, a control signal for issuing an instruction for a response of an operation state to a management device that transmits a control signal for issuing an instruction for a response of an operation state.

The drive circuit 1331a outputs, based on a contact signal for issuing an instruction for switching a contact point, a control signal for controlling a coil to be driven from an output terminal for a coil to be driven of the high-voltage relay 131a. The response control unit 1352 reads, based on a control signal for issuing an instruction for a response of an operation state, an operation state detected by the state detection unit 134 with respect to an interlocking relay associated with a high-voltage relay being a target.

The state detection unit 134 includes, as illustrated in FIG. 6, a determination unit 1341 that is connected to a movable contact point 1323a of the interlocking relay 132a and determines, based on a potential of the movable contact point 1323a, an operation state of the interlocking relay 132a and a state storage unit 1342 that stores an operation state of each of the interlocking relays 132a, 132b, and 132c.

While not illustrated in FIG. 6, the determination unit 1341 is also connected to a movable contact point of each of the interlocking relays 132b and 132c, determines, based on a potential of a movable contact point of each of the interlocking relays 132b and 132c, an operation state of each of the interlocking relays 132b and 132c, and stores the determined result in the state storage unit 1342.

Specifically, the determination unit 1341 of the state detection unit 134 compares a potential of the movable contact point 1323a of each of the interlocking relays 132a, 132b, and 132c with a reference voltage being not illustrated and determines whether a potential of each movable contact point is high or low. The determination unit 1341 stores the determined result in the state storage unit 1342.

The response control unit 1352 reads, from the state storage unit 1342, information indicating whether a potential of a movable contact point of each of the interlocking relays 132a, 132b, and 132c is high or low. The response control unit 1352 converts the read state of each of the interlocking relays 132a, 132b, and 132c to a digital signal and generates a response signal indicating a state of each of the high-voltage relays 131a, 131b, and 131c.

The response unit 135 includes, as illustrated in FIG. 6, an E/O converter 1351a and a response control unit 1352. The E/O converter 1351a converts, by using a dedicated wavelength, a response signal output from the response control unit 1352 from an electric signal to an optical signal. The E/O converter 1351a may be, not limited to, for example, an optical modulator that transmits a response signal by using a dedicated wavelength or may be an optical modulator that amplitude-modulates, based on a response signal, an excitation light source of an optical amplifier inside a branching device in a low-speed and shallow manner. The response control unit 1352 outputs, when responding to the management device 102a with a state of the high-voltage relay 131a, a response signal to an associated E/O converter 1351a.

As illustrated in FIG. 6, a response signal line 112a that transmits, inside the branching device 13, a response signal transmitted by the submarine cable 11a to the management device 102a includes an optical branching coupler 115a. The E/O converter 1351a outputs a response signal converted to an optical signal to the optical branching coupler 115a. An optical signal of a response signal is multiplexed, by the optical branching coupler 115a, with a communication signal transmitted by the response signal line 112a and is transmitted to the management device 102a.

While not illustrated in FIG. 6, a response signal line that transmits, inside the branching device 13, a response signal transmitted to the management devices 102b and 102c also includes an optical branching coupler. The response unit 135 also includes an E/O converter that converts, from an electric signal to an optical signal, a response signal transmitted to the management devices 102b and 102c. The response control unit 1352 outputs, when transmitting a response signal to the management device 102b and 102c, a response signal to an associated E/O converter. An E/O converter associated with each of the management device 102b and 102c being a transmission destination converts a response signal by using a dedicated wavelength and outputs an optical signal to an optical branching coupler of a response signal line associated with each of the management device 102b and 102c being a transmission destination. The output optical signal of the response signal is multiplexed with a communication signal of a response signal line for each of the management devices 102b and 102c by an optical branching coupler and is transmitted to each of the management device 102b and 102c being a transmission destination.

Figure 7:
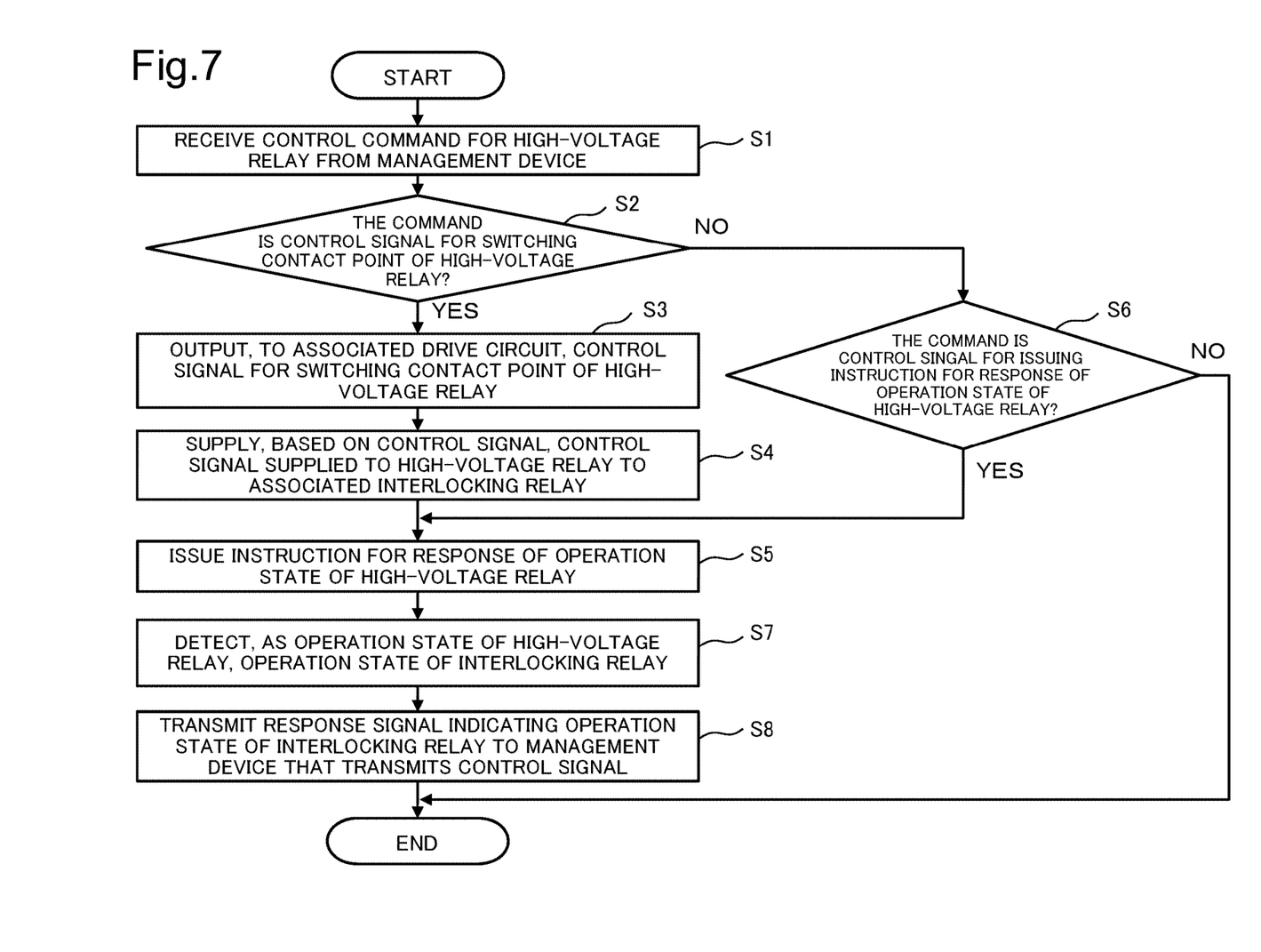
FIG. 7 is a flowchart illustrating an operation of a state response in FIG. 1

Next, an operation of the present example embodiment is described. FIG. 7 is a flowchart illustrating an operation of a state response in FIG. 1.

First, the drive control unit 1333 of the drive unit 133 determines, when receiving a control signal for a feeding path from each of the management device 102a, 102b, and 102c (step S1), the control signal is a control signal for issuing an instruction for switching a contact point of each of the high-voltage relays 131a, 131b, and 131c (step S2) When the control signal is a control signal for a feeding path, the drive control unit 1333 outputs, based on the control signal for the feeding path, a control signal for switching a contact point of each of the high-voltage relays 131a, 131b, and 131c to each of associated drive circuits 1331a, 1331b, and 1331c (step S3).

The drive circuits 1331a, 1331b, and 1331c of the drive unit 133 each supply, based on the control signal output from the drive control unit 1333, drive electric current supplied to a plurality of high-voltage relays 131a, 131b, and 131c to associated interlocking relays 132a, 132b, and 132c (step S4).

The drive control unit 1333 issues, to the response control unit 1352 of the response unit 135, an instruction for a response of an operation state of each of the high-voltage relays 131a, 131b, and 131c to each of the management devices 102a, 102b, and 102c that transmit a control signal for a feeding path (step S5).

The drive control unit 1333 determines, when in step S2, the control signal is not a control signal for issuing an instruction for switching, whether to be a control signal for issuing an instruction for a response of an operation state of each of the high-voltage relays 131a, 131b, and 131c (step S6). The drive control unit 1333 issues, to the response control unit 1352, when the control signal is a control signal for issuing an instruction for a response of an operation state, an instruction for a response of an operation state to the management devices 102a, 102b, and 102c that transmit a control signal, as in step S5.

The state detection unit 134 detects an operation state of each of the interlocking relays 132a, 132b, and 132c as an operation state of each of the high-voltage relays 131a, 131b, and 131c. Specifically, the determination unit 1341 of the state detection unit 134 compares a potential of a movable contact point of each of the interlocking relays 132a, 132b, and 132c with a reference voltage being not illustrated and determines whether to be high or low. The determination unit 1341 stores the determined result in a state storage unit associated with each of the interlocking relays 132a, 132b, and 132c (step S7).

The response control unit 1352 of the response unit 135 reads, from a state storage unit associated with each of the interlocking relays 132a, 132b, and 132c, information indicating whether a potential of a movable contact point of each of the interlocking relays 132a, 132b, and 132c detected, based on a signal from the drive control unit 1333, by the state detection unit 134 is high or low. The response unit 135 transmits a response signal indicating an operation state of a high-voltage relay to a management device that transmits a control signal of the high-voltage relay. Specifically, the response control unit 1352 of the response unit 135 converts, to a digital signal, an operation state of each of the interlocking relays 132a, 132b, and 132c read from a state storage unit associated with each of the interlocking relays 132a, 132b, and 132c. The response control unit 1352 generates, based on the converted digital signal, a response signal indicating a state of each of the interlocking relays 132a, 132b, and 132c. The response control unit 1352 transmits a response signal indicating an operation state of each of the interlocking relays 132a, 132b, and 132c to a management device that transmits a control signal for each of the high-voltage relays 131a, 131b, and 131c (step S8).

As described above, according to the present example embodiment, when a branching device of a remote control type is caused to include a response function for an operation state of a high-voltage relay inside the branching device, an operation state can be more simply and clearly discriminated. In order to detect an operation state of a branching device, an approach of examining a state of a contact point of an interlocking relay for monitoring that operates in synchronization with a high-voltage relay is employed, and therefore an accurate operation state can be grasped. In particular, in a non-latch-type high-voltage relay, a contact point is automatically switched based on not only a control instruction for switching a contact point but also a feeding fluctuation or ON/OFF of feeding, and therefore it is difficult to acquire an operation state of a branching device. According to the present example embodiment, an interlocking relay for monitoring that operates in synchronization with an operation of a high-voltage relay is used, and thereby a state of a non-latch-type high-voltage relay can be also certainly discriminated.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1 Submarine cable system
10a, 10b, 10c Land station
11a, 11b, 11c Submarine cable
12a, 12b, 12c Repeater
13 Branching device
101a, 101b, 101c Feeding device
102a, 102b, 102c Management device
111a Control signal line
112a Response signal line
113a Feeding line
114a, 115a Optical branching coupler
131a, 131b, 131c High-voltage relay
132a, 132b, 132c Interlocking relay
133 Drive unit
134 State detection unit
135 Response unit
1311a, 1321a L coil
1311c, 1321c Relay coil
1312a, 1322a R coil
1322c Spring
1323a, 1323c Movable contact point
1324a Contact point L
1324c, 1325c Contact point
1325a Contact point R
1326a, 1326c Resistor
1331a, 1331b, 1331c Drive circuit
1332a O/E converter
1333 Drive control unit
1341 Determination unit
1342 State storage unit 1351a E/O converter
1352 Response control unit

The invention claimed is:

1. A branching device comprising:
a plurality of interlocking relays individually associated with a plurality of high-voltage relays which switch a feeding path;
a plurality of drivers supplying drive electric current supplied to the plurality of high-voltage relays to the plurality of associated interlocking relays;
a state detector detecting an operation state of each of the plurality of interlocking relays as an operation state of each of the plurality of high-voltage relays; and
a responder transmitting, based on a result of detecting an operation state of each of the plurality of interlocking relays, an operation state of each of the plurality of high-voltage relays.

2. The branching device according to claim 1, wherein associated coils of the plurality of high-voltage relays and associated coils of the plurality of associated interlocking relays are connected in series.

3. The branching device according to claim 2, wherein the state detector detects, as an operation state of each of the plurality of interlocking relays, a potential of a movable contact point of each of the plurality of interlocking relays.

4. The branching device according to claim 2, wherein the drivers instruct, when supplying drive electric current to the plurality of high-voltage relays and the plurality of associated interlocking relays, the responder to transmit a response signal indicating an operation state of each of the plurality of high-voltage relays.

5. A submarine cable system comprising:
the branching device according to claim 2; and
a management device which transmits a control signal for the feeding path to the branching device and receives, from the branching device, a response signal indicating an operation state of each of the plurality of high-voltage relays.

6. The branching device according to claim 1, wherein associated coils of the plurality of high-voltage relays and associated coils of the plurality of associated interlocking relays are connected in parallel.

7. The branching device according to claim 6, wherein the state detector detects, as an operation state of each of the plurality of interlocking relays, a potential of a movable contact point of each of the plurality of interlocking relays.

8. The branching device according to claim 6, wherein the drivers instruct, when supplying drive electric current to the plurality of high-voltage relays and the plurality of associated interlocking relays, the responder to transmit a response signal indicating an operation state of each of the plurality of high-voltage relays.

9. A submarine cable system comprising:
the branching device according to claim 6; and
a management device which transmits a control signal for the feeding path to the branching device and receives, from the branching device, a response signal indicating an operation state of each of the plurality of high-voltage relays.

10. The branching device according to claim 1, wherein the state detector detects, as an operation state of each of the plurality of interlocking relays, a potential of a movable contact point of each of the plurality of interlocking relays.

11. The branching device according to claim 10, wherein the drivers instruct, when supplying drive electric current to the plurality of high-voltage relays and the plurality of associated interlocking relays, the responder to transmit a response signal indicating an operation state of each of the plurality of high-voltage relays.

12. A submarine cable system comprising:
the branching device according to claim 10; and
a management device which transmits a control signal for the feeding path to the branching device and receives, from the branching device, a response signal indicating an operation state of each of the plurality of high-voltage relays.

13. The branching device according to claim 1, wherein the drivers instruct, when supplying drive electric current to the plurality of high-voltage relays and the plurality of associated interlocking relays, the responder to transmit a response signal indicating an operation state of each of the plurality of high-voltage relays.

14. A submarine cable system comprising:
the branching device according to claim 13; and
a management device which transmits a control signal for the feeding path to the branching device and receives, from the branching device, a response signal indicating an operation state of each of the plurality of high-voltage relays.

15. A submarine cable system comprising:
the branching device according to claim 1; and
a management device which transmits a control signal for the feeding path to the branching device and receives, from the branching device, a response signal indicating an operation state of each of the plurality of high-voltage relays.

* * * * *